(12) United States Patent
Erdl et al.

(10) Patent No.: US 10,989,384 B2
(45) Date of Patent: Apr. 27, 2021

(54) LIGHTING DEVICE FOR A MOTOR VEHICLE

(71) Applicant: Bayerische Motoren Werke Aktiengesellschaft, Munich (DE)

(72) Inventors: Helmut Erdl, Flintsbach (DE); Abdelmalek Hanafi, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 12 days.

(21) Appl. No.: 16/438,642

(22) Filed: Jun. 12, 2019

(65) Prior Publication Data

US 2019/0293253 A1 Sep. 26, 2019

Related U.S. Application Data

(63) Continuation of application No. PCT/EP2018/054130, filed on Feb. 20, 2018.

(30) Foreign Application Priority Data

Mar. 9, 2017 (DE) ................ DE10 2017 203 892.6

(51) Int. Cl.
*F21S 41/16* (2018.01)
*F21S 45/10* (2018.01)

(52) U.S. Cl.
CPC ............... *F21S 41/16* (2018.01); *F21S 45/10* (2018.01)

(58) Field of Classification Search
CPC ............................... F21S 41/16; B81B 7/0087
See application file for complete search history.

(56) References Cited

U.S. PATENT DOCUMENTS

2012/0169231 A1   7/2012 Dinc et al.
2013/0094235 A1*  4/2013 Sugiyama ............... F21S 41/16
                                                            362/514
(Continued)

FOREIGN PATENT DOCUMENTS

DE  10 2010 050 747 A1   5/2012
DE  10 2012 205 437 A1  10/2013
(Continued)

OTHER PUBLICATIONS

International Search Report (PCT/ISA/210) issued in PCT Application No. PCT/EP2018/054130 dated Jun. 12, 2018 with English translation (four (4) pages).
(Continued)

*Primary Examiner* — Jong-Suk (James) Lee
*Assistant Examiner* — Eric T Eide
(74) *Attorney, Agent, or Firm* — Crowell & Moring LLP

(57) ABSTRACT

A lighting device for a motor vehicle is provided that includes a laser light source including a plurality of laser diodes, a vector scanner on which falls at least one light bundle from the laser light source, and a control device. The vector scanner changes the position of the light bundle which moves a light spot produced from the light bundle to generate a predetermined light distribution. The vector scanner includes at least one MEMS component containing a housing, a semiconductor chip, a mirror on which at least one light bundle falls, and a temperature sensor for detecting the temperature of the MEMS component. The control device controls the electrical power of the laser light source and/or a cooling element arranged on the MEMS component according to the detected temperature of the MEMS component, such that the detected temperature does not exceed a predetermined temperature threshold value.

13 Claims, 1 Drawing Sheet

(56) References Cited

U.S. PATENT DOCUMENTS

| | | | |
|---|---|---|---|
| 2013/0278900 A1* | 10/2013 | Hertel | G03B 21/10 353/28 |
| 2015/0175054 A1* | 6/2015 | Yatsuda | F21S 41/255 362/465 |
| 2015/0285457 A1 | 10/2015 | Erdl et al. | |
| 2017/0138556 A1* | 5/2017 | Hager | F21S 41/675 |
| 2018/0142856 A1 | 5/2018 | Reinprecht et al. | |
| 2018/0147978 A1* | 5/2018 | Reisinger | B60Q 1/085 |
| 2018/0176524 A1* | 6/2018 | Kobori | H04N 9/3144 |
| 2019/0094668 A1* | 3/2019 | Holzinger | G02B 27/0927 |

FOREIGN PATENT DOCUMENTS

| | | |
|---|---|---|
| DE | 10 2012 223 610 A1 | 6/2014 |
| DE | 10 2014 214 522 A1 | 1/2016 |
| DE | 20 2016 102 988 U1 | 7/2016 |
| DE | 10 2015 213 708 A1 | 1/2017 |
| EP | 2 784 568 A1 | 10/2014 |
| EP | 2 821 692 A1 | 1/2015 |
| WO | WO 2016/197167 A1 | 12/2016 |

OTHER PUBLICATIONS

German-language Written Opinion (PCT/ISA/237) issued in PCT Application No. PCT/EP2018/054130 dated Jun. 12, 2018 (seven (7) pages).

German-language Search Report issued in counterpart German Application No. DE 10 2017 203 892.6 dated Sep. 1, 2017 with partial English translation (13 pages).

\* cited by examiner

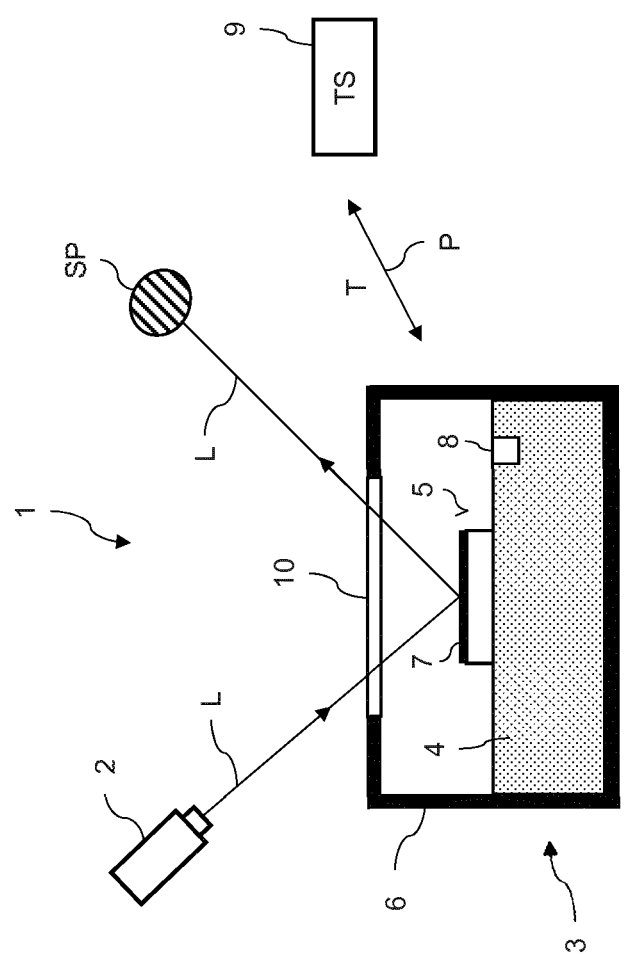

LIGHTING DEVICE FOR A MOTOR VEHICLE

CROSS REFERENCE TO RELATED APPLICATIONS

This application is a continuation of PCT International Application No. PCT/EP2018/054130, filed Feb. 20, 2018, which claims priority under 35 U.S.C. § 119 from German Patent Application No. 10 2017 203 892.6, filed Mar. 9, 2017, the entire disclosures of which are herein expressly incorporated by reference.

BACKGROUND AND SUMMARY OF THE INVENTION

The invention relates to a lighting device for a motor vehicle.

From the state of the art it is known to use in a motor vehicle a scanning lighting device in which one or more light bundles of a light-source are deflected with the aid of a scanning motion, and with the aid of this a spot of light is moved, in order to generate a predetermined distribution of light—such as a low beam, for example—in the far field of the motor vehicle. In such lighting devices so-called MEMS components (MEMS=Micro-Electro-Mechanical System) frequently come into operation, in which the deflection of the light bundle or bundles is undertaken with the aid of a continuously movable mirror integrated within a semiconductor chip.

In conventional scanning lighting devices with MEMS components contained therein there is the problem that in the course of the generation of the light bundles to be deflected with the aid of a source of laser light a high thermal loading of the mirror in the MEMS component arises, which may result in a reduced service life of the lighting device, and possibly also in damage thereto.

It is therefore an object of the invention to create a scanning lighting device for a motor vehicle with one or more MEMS components, the thermal loading of which is reduced.

This object is achieved by the lighting device according to claim 1. Further developments of the invention are defined in the dependent claims.

The lighting device according to the invention is provided for a motor vehicle and encompasses a source of laser light, consisting of a number of laser diodes (that is to say, at least one laser diode), and also a vector scanner on which one or more light bundles impinge which emanate from the light of the source of laser light.

The vector scanner has been configured in such a manner that in operation of the lighting device it varies the position of the light bundle or bundles and, thus, moves a spot of light, which is generated from the light bundle or bundles, at a distance from the lighting device in order to generate a predetermined distribution of light. The special feature of a vector scanner consists in the fact that the scan speed at which the spot of light is moved, and/or the scan path along which the spot of light is moved, can be varied by the vector scanner. Consequently differing distributions of light can be generated very flexibly. A vector scanner differs from a conventional line scanner in this feature. For the purpose of varying the scan speed or the scan path, the vector scanner contains a suitable control unit which may possibly have been integrated within the control device described further below.

The vector scanner of the lighting device according to the invention encompasses one or more MEMS components which each contain a semiconductor chip which is surrounded by a housing and within which a single mirror has been integrated, on which at least one light bundle from the light bundle or bundles impinges. The MEMS component in this case has been configured in such a manner that the mirror is tilted continuously for the purpose of moving the spot of light. In a preferred variant, in top view the mirror has a maximal extent between 1 mm and 6 mm. For the purpose of tilting the mirror in the MEMS component, use may be made of actuators known as such—for example, electrostatic and/or magnetic actuators and/or piezo actuators. By reason of the feature of continuous tilting and also the use of a single mirror, the MEMS component that is used in the invention differs from digital light modules consisting of micromirrors, in which the mirrors can occupy only two discrete positions.

The lighting device according to the invention is distinguished in that a temperature sensor for detecting the temperature of the respective MEMS component is provided on a respective MEMS component, in particular within the housing of a respective MEMS component, but possibly also outside the housing. Over and above this, the lighting device encompasses a control device which has been configured in such a manner that it controls, as a function of the detected temperature of the respective MEMS component, the electrical power of the source of laser light and/or of an electrically operated cooling element (for example, a Peltier element) arranged on the MEMS component, in such a manner that the detected temperature does not exceed a predetermined temperature threshold value. If present, the cooling element is an integral part of the lighting device according to the invention. If only the electrical power of the source of laser light (that is to say, not the electrical power of a cooling element) is controlled in the lighting device according to the invention, the lighting device also does not have to encompass a cooling element.

The lighting device according to the invention has the advantage that a thermal overheating is avoided in a straightforward manner with the aid of a temperature sensor in the respective MEMS components and a temperature control based thereon. Depending upon the configuration, the temperature sensor may have been realized in various ways. In a preferred variant, the temperature sensor is a so-called thermistor in which the detection of the temperature is based on a measurement of resistance. In particular, semiconductor elements may also be used as temperature sensors.

The electrical power of the source of laser light may be of differing magnitude, depending upon the variant of the lighting device. In a preferred configuration, the maximally adjustable power of the source of laser light is between 100 mW and 6 W. Depending upon the configuration of the lighting device according to the invention, with the source of laser light thereof monochromatic laser light—such as, for example, with a wavelength of 450 nm—or possibly also white laser light can be generated. In particular, there is also the possibility that a conversion element—consisting of phosphor, for example—has been arranged downstream of a source of monochromatic laser light, in order to convert the monochromatic light into a bundle of white light.

In an advantageous embodiment of the lighting device according to the invention, the temperature sensor for at least one MEMS component has been integrated within the housing of the corresponding MEMS component.

In another preferred variant of the lighting device according to the invention, the temperature sensor for at least one MEMS component has been integrated within the semiconductor chip. Nonetheless, there is also the possibility that the temperature sensor for at least one MEMS component has been attached to the housing of the component and is consequently not an integral part of the semiconductor chip.

In another preferred variant, the temperature threshold value, which by reason of the control by the control device is not exceeded, lies within a temperature interval that corresponds to a temperature of the housing of the MEMS component between 60° C. and 100° C., preferentially between 60° C. and 80° C. Through such a choice of the temperature threshold value, an overheating of the mirror is prevented efficiently.

In another preferred variant of the invention, the control device has been configured in such a manner that within a predetermined temperature range of the detected temperature, which preferentially terminates at the temperature threshold value, it decreases the electrical power of the source of laser light more intensely, the more intensely the detected temperature increases. The intensity of the decrease of the electrical power or the intensity of the increase of the detected temperature is represented, in particular, by the variation of these quantities within a predetermined time-interval.

In another preferred embodiment, the control device of the lighting device according to the invention has been configured in such a manner that it switches the source of laser light off if the detected temperature reaches the predetermined temperature threshold value or the predetermined temperature threshold value minus a tolerance value. By this means, a thermal overloading of the lighting device is efficiently avoided.

Depending upon the variant, the lighting device according to the invention may have been provided in the motor vehicle for differing purposes. In one configuration, the lighting device encompasses a headlight that has been set up to generate a low-beam and/or high-beam distribution of light by way of predetermined distribution of light. The headlight is preferentially a front headlight. There is also the possibility that the lighting device encompasses a vehicle signal light, in particular a tail-light and/or a stop-light, which has been set up to generate a signal function by virtue of the predetermined distribution of light.

In a further embodiment of the lighting device according to the invention, the vector scanner encompasses a single MEMS component, on the mirror of which the light bundle or bundles impinge(s), in which connection a single bundle of light preferentially impinges on the mirror. Depending upon the intended use of the lighting device, this single bundle of light may consist of white light or may also have a different color. With this variant of the invention, a compact structure of the lighting device is obtained.

In a further variant of the invention, the vector scanner encompasses several MEMS components, on the mirrors of which a separate light bundle out of several light bundles impinges in each instance, all the separate light bundles being superposed to form the spot of light after passing through the MEMS components. This superposition of the separate light bundles preferentially yields white light, so this lighting device is very well suited as a headlight. The separate light bundles in this case preferentially have the respective colors red, green and blue.

In addition to the above lighting device, the invention further relates to a motor vehicle that encompasses one or more lighting devices according to the invention or one or more preferred variants of these lighting devices.

Other objects, advantages and novel features of the present invention will become apparent from the following detailed description of one or more preferred embodiments when considered in conjunction with the accompanying drawing.

BRIEF DESCRIPTION OF THE DRAWING

An example of an embodiment of the invention will be described in detail in the following with reference to the appended drawing. This FIGURE shows, in a schematic side view, a variant of a lighting device according to the invention.

DETAILED DESCRIPTION OF THE DRAWING

In the drawing an embodiment of a lighting device 1 according to the invention is shown in the form of a front headlight of a motor vehicle. This lighting device encompasses a source of laser light 2 which encompasses one and optionally also several RGB laser diodes for generating a single white bundle of laser light L. This bundle of laser light is indicated schematically in the drawing by corresponding arrows. The lighting device further encompasses a vector scanner 3 which takes the form of a single MEMS component. Such MEMS components are known as such and encompass a single semiconductor chip, within which actuators for moving at least one element in the semiconductor chip have been integrated.

The MEMS component in the embodiment shown in the drawing contains the aforementioned semiconductor chip 5 encompassing a silicon substrate 4 on which a mirror 7 with an upper reflective coating is located. Over and above this, within the semiconductor chip 5 a temperature sensor 8 in the form of a thermistor is integrated which will be elucidated in more detail further below. The MEMS component further encompasses a rectangular housing 6 which is arranged around the semiconductor chip 5 and on the upper side of which a transparent window 10 is provided. The space between the semiconductor chip 5 and the housing 6 has preferentially been filled with a gas such as helium, for example.

The bundle of laser light originating from the source of laser light 2 impinges on the mirror 7 through the window 10. The bundle of laser light is reflected on the mirror and reaches the outside again via the window 10, in order to generate a spot of light SP in the far field of the motor vehicle. The mirror 7 is capable of being moved continuously by means of the actuators in the semiconductor chip, in order to bring about a scanning motion of the spot of light SP.

In contrast to line scanners, the vector scanner 3 can vary the scan speed, at which the spot of light SP is moved, and also the scan path, along which the spot of light is moved. For this purpose, a control unit (not shown) is provided, which optionally may also have been integrated within the schematically represented control device 9. With the aid of the movement of the spot of light by means of the mirror 7, a suitable distribution of light—such as, for example, a low-beam distribution or a high-beam distribution—can be variably generated by the headlight. The control device 9 already mentioned is communicatively connected to the vector scanner 3 and also to a source of laser light 2, as indicated by the double-headed arrow P.

In conventional vector scanners with a source of laser light there is the problem that an overheating of the MEMS component may occur by reason of the high power of the laser light, since some of the laser beams (as a rule, 5% or less) are absorbed by the mirror. In order to counteract an overheating of the MEMS component and possible associated damage to or destruction of the component, the temperature sensor 8 is used in the embodiment described herein. This temperature sensor detects the temperature T of the MEMS component and transmits said temperature to the control device 9. In the control device a temperature threshold value TS has been stored which in operation of the lighting device must not be exceeded. Accordingly, the control device encompasses a control system which prevents this temperature threshold value from being exceeded. The temperature threshold value preferentially lies within a temperature interval that corresponds to a temperature of the housing of the MEMS component between 60° C. and 100° C., preferentially between 60° C. and 80° C.

In other words, it is ensured by the control device 9 that the detected temperature T remains below the temperature threshold value TS. In the embodiment described herein, this is obtained by virtue of the fact that the control device is able to vary the electrical power of the source of laser light 2. If the detected temperature T comes into the vicinity of the temperature threshold value TS, the electrical power of the source of laser light 2 is decreased and, where appropriate, the source of laser light is also switched off, so that an overheating of the MEMS component does not occur.

In a preferred embodiment of the control system, the power of the source of laser light is decreased by the control device 9 more intensely, the more intensely the detected temperature increases. The intensity of the decrease of the power is represented by the decline of the power within a predetermined time-interval (for example, 1 second). Analogously, the intensity of the increase in temperature is represented by the rise in temperature within the same predetermined time-interval. Analogously, in the event of a decline of the detected temperature the power of the source of laser light can also be increased again as a function of the magnitude of the decline. By this means, a regulation of the temperature to a desired value, which lies below the temperature threshold value TS, can be obtained.

In a special arrangement, the temperature signal of the temperature sensor can also be utilized in order to drive an active cooling element, such as a Peltier element for instance, provided on the MEMS component, with which a further rise in temperature can be prevented. In a further embodiment, the temperature signal can also be utilized in order at low temperatures—such as, for instance, for temperatures below −30° C.—to drive a heater arranged on the MEMS component, in order to keep the vector scanner within a favorable working range.

In the foregoing the invention was described with reference to a lighting device with an RGB source of laser light which generates white light which impinges on a single MEMS component. Where appropriate, it is also possible that the source of laser light is a source of monochromatic laser light, such as, for example, a source of blue laser light. The light of this source of laser light can be converted with the aid of a phosphor layer into white laser light which subsequently, analogously to the embodiment shown in the drawing, impinges on a MEMS component. Similarly, there is the possibility that three bundles of laser light having the colors red, green and blue are generated, each of these bundles of laser light impinging on a separate MEMS component with a corresponding mirror. By synchronous movement of the mirrors, the individual light bundles are then combined to form a common spot of light which appears white by virtue of the mixing of the colors red, green and blue.

Over and above this, the temperature sensor 8 does not necessarily have to have been integrated directly within the semiconductor chip of the MEMS component. Rather, the temperature sensor may also have been attached outside the semiconductor chip but within the MEMS component, for example on the inside of the housing 6. Where appropriate, the temperature sensor may also have been attached to the MEMS component at a place outside the housing 6.

The invention is furthermore also not restricted to a lighting device in the form of a motor-vehicle headlight. Rather, the lighting device may also be a vehicle signal light such as, for example, the tail-light of a motor vehicle, in which case a colored spot of light, for example colored red, is preferentially generated.

The embodiments of the invention described in the foregoing have a number of advantages. In particular, in a lighting device that encompasses a variably adjustable vector scanner and a source of laser light it is ensured in suitable manner that an overheating of the vector scanner configured as a MEMS component does not occur. This is obtained by virtue of a temperature sensor in the MEMS component. Depending on the temperature detected by this temperature sensor, it is ensured by means of a control system that a temperature threshold value is not exceeded.

LIST OF REFERENCE SYMBOLS 1 lighting device
2 source of laser light
3 vector scanner
4 substrate
5 semiconductor chip
6 housing
7 mirror
8 temperature sensor
9 control device
10 window
P double-headed arrow
T detected temperature
TS temperature threshold value
L light bundle
SP spot of light The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A lighting device for a motor vehicle, comprising:
a source of laser light including a plurality of laser diodes;
a vector scanner, on which a light bundle emanating from a light of the source of laser light impinges;
wherein the vector scanner varies a position of the light bundle and moves a spot of light, which is generated from the light bundle, at a distance from the lighting device in order to generate a predetermined distribution of light, wherein at least one of a scan speed, at which the spot of light is moved, and a scan path, along which the spot of light is moved, is variable by the vector scanner;
wherein the vector scanner includes one or more MEMS components which each contain a semiconductor chip which is surrounded by a housing and within which a single mirror is integrated, on which the light bundle impinges, wherein the MEMS component is configured such that the single mirror is tilted continuously for moving the spot of light;

wherein a temperature sensor for detecting a temperature of a respective MEMS component is provided in the respective MEMS component; and a control device configured to control at least one of electrical power of the source of laser light, and a cooling element arranged on the respective MEMS component, as a function of the detected temperature of the respective MEMS component in such a manner that the detected temperature does not exceed a predetermined temperature threshold value.

2. The lighting device according to claim 1, wherein the temperature sensor for the respective MEMS component is integrated within the housing.

3. The lighting device according to claim 1, wherein the temperature sensor for the respective MEMS component is integrated within the semiconductor chip.

4. The lighting device according to claim 1, wherein the temperature sensor for the respective MEMS component is attached to the housing.

5. The lighting device according to claim 1, wherein the predetermined temperature threshold value lies within a temperature range that corresponds to a temperature of the housing of the respective MEMS component between 60° C. and 100° C.

6. The lighting device according to claim 1, wherein the control device is configured such that, within a predetermined temperature-range of the detected temperature, the control device decreases the electrical power of the source of laser light as the detected temperature increases.

7. The lighting device according to claim 1, wherein the control device is configured to switch off the source of laser light when the detected temperature reaches the predetermined temperature threshold value or the predetermined temperature threshold value minus a tolerance value.

8. The lighting device according to claim 1, wherein the vector scanner includes a single MEMS component, and the light bundle is a single light bundle that impinges on the single mirror.

9. The lighting device according to claim 2, wherein the temperature sensor for the respective MEMS component is integrated within the semiconductor chip.

10. The lighting device according to claim 2, wherein the temperature sensor for the respective MEMS component is attached to the housing.

11. The lighting device according to claim 1, wherein the predetermined temperature threshold value lies within a temperature range that corresponds to a temperature of the housing of the respective MEMS component between 60° C. and 80° C.

12. The lighting device according to claim 2, wherein the control device is configured such that, within a predetermined temperature-range of the detected temperature, the control device decreases the electrical power of the source of laser light as the detected temperature increases.

13. The lighting device according to claim 2, wherein the control device is configured to switch off the source of laser light when the detected temperature reaches the predetermined temperature threshold value or the predetermined temperature threshold value minus a tolerance value.

\* \* \* \* \*